United States Patent Office 3,657,369
Patented Apr. 18, 1972

3,657,369
OLIGIMERIZATION OF ISOBUTENE AND α-METHYLSTYRENE
Gary L. Driscoll, Boothwyn, Pa., and David L. Kerr, Wilmington, Del., assignors to Sun Oil Company, Philadelphia, Pa.
No Drawing. Filed July 6, 1970, Ser. No. 52,773
Int. Cl. C07c 15/10
U.S. Cl. 260—669 P           6 Claims

ABSTRACT OF THE DISCLOSURE

Simultaneously or successively polymerizing of isobutene to form a polyisobutene having a viscosity index of from 95–130, and α-methylstyrene, using stannic chloride as the catalyst and nitromethane as the solvent at from —30 to 200° C. and preferably from 0° C. to 50° C. The stannic chloride is present in from 0.5 to 40 and preferably .1 to 20 volume percent as based on the nitromethane present.

CROSS REFERENCES TO RELATED APPLICATIONS

This application is related to U.S. application Ser. No. 52,771, now abandoned, entitled "Polymerization of Dialkyl Vinylidene Compounds to Oils," filed on even date herewith by Gary L. Driscoll; U.S. application Ser. No. 53,268 entitled "Phosphorus Compound Promoted Oligimerization of Isobutene," filed on even date herewith by Gary L. Driscoll; U.S. application Ser. No. 52,772 entitled "Preparation of Oils from Isobutene," filed on even date herewith by Gary L. Driscoll; and U.S. application Ser. No. 52,300 entitled "Branched Hydrocarbons in the $C_{16-40}$ Range Having Maximally Crowded Geminal Methyl Groups," filed on even date herewith by Gary L. Driscoll, Irl N. Duling, David S. Gates and Robert W. Warren; the disclosures of which are hereby incorporated by reference.

BACKGROUND OF THE INVENTION

In the past, traction transmissions utilizing rolling traction surfaces have found only limited use due to the lack of a fluid to lubricate such surfaces while still maintaining an adequate coefficient of traction. Recently several fluids have been discovered which have an adequate coefficient of traction but which have a lower viscosity index than is desired. In the past, oils prepared from isobutene have been produced using catalyst systems based on aluminum chloride and boron trifluoride. These systems are severe in nature and produce oils having a nearly continuous spectrum of numbers of carbon atoms and isomeric structures. In general, and apparently due to this wide spectrum of isomeric structures in the various oil molecules, these processes produce oils having a relatively low viscosity index. In general these processes suffer from an inability to produce an oil having a viscosity index greater than 85.

When formulating a traction fluid, a blend of poly-isobutene oil and poly-α-methylstyrene oil has been found to be desirable. In the past separate facilities for the preparation of these two materials have been required.

SUMMARY OF THE INVENTION

It has now been found that polyisobutene oils having high viscosity index (hereinafter referred to as V.I.) which generally is in the range of from 90 to 130 and preferably from 95 to 130, as determined by ASTM D-2207, as well as Viscosity Temperature Function viscosity index in these ranges, as determined by the techniques of W. A. Wright as set forth in ASTM Bulletin #215, 84 (1956) (hereinafter referred to as VTF–VI), can be prepared using a catalyst system which also serves to polymerize α-methylstyrene to the degree desired when forming a traction fluid of a blend of polyisobutene and poly-α-methylstyrene. This is accomplished by proper selection of solvent and catalyst. The solvent serves as a polar solvent to solvate the intermediate carbonium ions formed during the reaction, and to complex the catalyst to give a catalytically active species which remains in the solvent phase. The solvent as used herein also dissolves appreciable amounts of monomers but only very limited amounts of the polymers. This last property is believed to be responsible for the narrow molecular weight distribution obtained in the product which results in a more favorable product distribution as regards producing a high viscosity index product. Nitromethane has been found to be preferred for meeting the requirements as a solvent for this purpose.

The catalyst used in the present process is stannic chloride. The stronger Lewis acids aluminum chloride, aluminum bromide, titanium tetrachloride, and antimony pentachloride do not cause any polymerization of isobutene in nitromethane. Boron trifluoride in nitromethane gives an oil product having a lower viscosity index of about 75. Stannic chloride has been found not to catalyze the polymerization of isobutene in such solvents as ether, water, dioxane, acetic acid, acetone, acetonitrile, acetic anhydride, diethylene glycol monoethyl ether, chloroform, methyl acetate, dimethoxyethane, N-methylpyrrolidone, and hexamethylphosphoramide.

In general, the temperature can be varied from —30° C. to +200° C. with from 0° C. to 50° C. being the preferred range. When the polymerization of isobutene and α-methylstyrene are performed separately, it is preferred to use a temperature of from 40 to 150° C. for the polymerization of α-methylstyrene (2-phenyl-1-propene) and a temperature of from 0 to 50° C. for the polymerization of isobutene. The volume of oil prepared is generally at least equal to the volume of nitromethane for a given run but the ratio of volume of oil prepared to volume of nitromethane present may easily exceed 10:1. When carrying out the present invention in a continuous operation by continuously feeding isobutene and/or α-methylsytrene, stannic chloride, and nitromethane while continuously removing the reaction medium and separating the product from the catalyst and solvent; the ratio of solvent to product generally is maintained at from 1:2 to 2:1.

The catalysts may be used in an amount equal to from 0.1 to 40 volume percent of the nitromethane present, and preferably from 1 to 20 volume percent of the nitromethane present.

The concentration of free isobutene in the reaction medium is relatively small and can be controlled by the pressure maintained at a given temperature thus controlling the molecular weight of the product. Generally, pressures of from about 1 to 275 p.s.i. absolute have been found suitable, with from 10 to 100 p.s.i. absolute being the preferred range. When the α-methylstyrene is polymerized separately, the pressure is not particularly critical but generally will also be in the preferred range of 10 to 100 p.s.i. absolute due to apparatus limitations.

Conversions of isobutene to the various telomers of 100% are obtained under appropriate combinations of conditions. Yields of 300 to 500 ml. of oil per gram of catalyst are readily attainable. The feed stock can vary from 5 to 100% isobutene, the remainder being any inert hydrocarbons. The presence of other butenes, each in amounts equal to the isobutene concentration, is not detrimental, since isobutene is selectively polymerized by the catalyst system. The efficiency of isobutene removal from such isobutene-butenes mixtures depends on the particular conditions being used but can be at least 80%.

The present process is relatively insensitive to small amounts of impurities such as air, organo-sulfur, or organo-nitrogen compounds.

The polyisobutene oils of the present invention may have a molecular weight of from 224 to 2,000. The preferred isobutene product is the tetramer to decamer range. The tetramer in the present case consists of a major and a minor component. The hydrogenated major tetramer component has the structure:

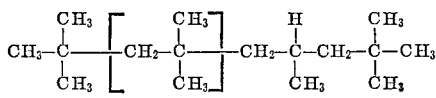

and the hydrogenated minor component has the structure:

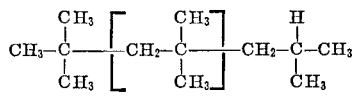

The latter structure predominates above the tetramer, i.e., at the pentamer and above. The repeating unit for the pentamer and higher oligimers is indicated by the brackets in the first structural formula.

The dimer and trimer are the preferred α-methylstyrene products. In a vented transmission an oil having high oxidative stability is preferred and this property is improved by hydrogenating the unsaturated oil. These unsaturated oils are readily hydrogenated using a conventional hydrogenation catalyst such as platinum, palladium or rhodium. Generally the higher molecular weight material may be left with the tetramer to decamer range material, but the dimers and trimers of isobutylene should be separated therefrom along with the monomer. This is readily accomplished by distillation.

The requirements of a traction transmission are discussed in U.S. Pats. Nos. 2,459,377; 3,440,894; and 3,411,369. Exemplary tractive devices in which the traction fluids of the present invention find use are disclosed in U.S. Pats. Nos. 1,867,553; 2,871,714; 3,006,206; and 3,184,990.

The poly-α-methylstyrene produced herein preferably has an average molecular weight of from 236 to 472. This product is hydrogenated along with the polyisobutene produced. The hydrogenated oils as produced by the present invention preferably contain from 10 to 90 wt. percent as based on the total composition of the hydrogenated low polymers of α-methylstyrene to form traction fluids.

DESCRIPTION OF THE PREFERRED EMBODIMENTS

EXAMPLE I

Nitromethane (200 ml.) and SnCl₄ (5 ml.) are stirred in a three-necked, round-bottomed flask (500 ml.) equipped with a gas inlet tube, mechanical stirrer, reflux condenser, external bath and thermometer, while isobutene is passed into the mixture kept at 35° C. The heat of reaction maintains the contents about 15° C. higher than the external bath. The isobutene is fed to the flask at a rate sufficient to maintain no flow on the outlet side after air has been removed from the reactor. After 26 min., the isobutene flow is stopped and 131 ml. of α-methylstyrene is added over a period of 40 minutes. The mixture is allowed to stir for one hour before work-up. The product amounted to 280 ml., which is the calculated amount. This agreement indicates excellent control over the reaction. The contents of the flask are then transferred to a separatory funnel. After allowing five minutes for phase separation, the nitromethane layer is drained from the bottom of the funnel. The oil layer is washed twice with saturated aqueous sodium chloride solution, once with aqueous, 5% sodium hydroxide solution and twice more with saturated aqueous sodium chloride solution. The oil layer is then dried over anhydrous calcium chloride. The mixture is then hydrogenated over Raney nickel at 180° C. and 2000 p.s.i.g. hydrogen, which results in incomplete hydrogenation. The mixture is then passed over an alumina column and topped by removing the fraction boiling up to 80° C. at 0.5 mm. Hg. The resulting oil is rehydrogenated at 200° C. and 2500 p.s.i.g. hydrogen over Raney nickel. After work-up, infrared analysis shows that this hydrogenation left the aromatic ring of the indan structure still remaining.

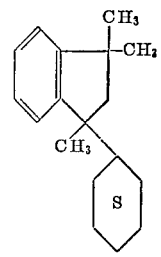

Hydrogenation using 5% rhodium on carbon proceeds rapidly starting at around 80–100° C. and going to completion at 180° C. and 2500 p.s.i.g. hydrogen within six hours. The resulting fluid has the following properties:

$KV_{210}=7.54$, $KV_{100}=95.4$, VTF–VI=−7, ASTM–VI=6.

As used herein, KV stands for Kinematic Viscosity as determined by ASTM D–445 and ASTM–VI stands for Viscosity Index as determined by ASTM D–2270.

The oil is 40% isobutene and 60% α-methylstyrene.

EXAMPLE II

Example I is repeated except that the α-methylstyrene was added over a period of five minutes. The product obtained was 275 ml. vs. the expected 280 ml. Again, hydrogenation is only partially successful using Raney nickel and fast, smooth and complete using 5% rhodium on carbon. The final stages of the work-up involve removal of the hydrogenation catalyst by filtration, removal of low boiling components by topping at 80° C. at 0.25 mm. Hg (removal of components up to and including some isobutene tetramers) and passing the entire residual oil over a short (one foot) alumina column at 25–30° C. The properties of the oil are: $KV_{210}=13.61$ cs., $KV_{100}=357.6$ cs., VTF–VI=−57, ASTM–VI=0.

EXAMPLE III

Example I is repeated except the temperature is maintained at 25° C. for isobutene addition over 7 minutes. Then 164 ml. of α-methylstyrene is added over 47 minutes. The product amounts to 205 ml. against the expected 210 ml. This product is 75% α-methylstyrene polymer and 25% polyisobutene. The properties of the product are: $KV_{210}=17.45$, $KV_{100}=797.3$, VTF–VI=−139, ASTM–VI=0.

EXAMPLE IV

A 250 ml. glass pressure bottle equipped with two inlet tubes is set up in a bath maintained at 20° C. To this are added 50 ml. of nitromethane and 1 ml. of stannic chloride. Isobutene is fed continuously at 10 p.s.i.g. while α-methylstyrene is added in 10 ml. increments spaced about 10 minutes apart. The total product is 135 ml. (insoluble in nitromethane at 25° C.). This is vacuum distilled to collect 90 ml. of oil boiling from 80° C. to 220° C. at 0.2 mm. Hg. This oil is hydrogenated over Raney nickel catalyst at 180° C. and 2000 p.s.i.g. hydrogen pressure. The vapor phase chromatogram of the product is interpreted to show that the product is basically a mixture of the two polymers with less than 10% alkylation or copolymerization products. The fluid contained about 40% hydrogenated α-methylstyrene dimer and trimer, mostly as the dimer. The properties of the product are:

|  | $KV_{210}$, °F. cs. | $KV_{100}$, °F. cs. | VTF-VI | ASTM-VI |
|---|---|---|---|---|
| Before hydrogenation | 2.81 | 13.84 | 36 | 23 |
| After hydrogenation | 2.81 | 13.29 | 55 | 42 |

EXAMPLE V

Example I is repeated except that the temperature of the reaction medium is maintained at between 55 and 60° C. for the α-methylstyrene addition period. The resulting oil has the following properties: $KV_{210}=4.40$ cs., $KV_{100}=31.0$ cs., VTF-VI=33, ASTM-VI=16.

The invention claimed is:

1. A process of polymerizing isobutene and α-methylstyrene in the same reactor comprising contacting isobutene and α-methylstyrene dissolved in nitromethane with a catalytic amount of stannic chloride present in an amount of from 0.1 to 40 volume percent of the nitromethane present, at from −30° C. to 200° C. and recovering from the reaction mixture an oil which consists essentially of a mixture of polyisobutene and poly-α-methylstyrene.

2. The process of claim 1 wherein the isobutene and α-methylstyrene are polymerized in successive steps.

3. The process of claim 2 wherein the temperature used in the isobutene polymerization step is from 0° C. to 50° C. and from 40 to 150° C. in the α-methylstyrene polymerization step.

4. The process of claim 3 wherein the amount of α-methylstyrene fed to the reactor is from 10 to 90 weight percent of the weight of the total amount of monomers fed to the reactor.

5. The process of claim 4 wherein the amount of stannic chloride present is from 1 to 20 volume percent as based on the nitromethane present.

6. The process of claim 1 wherein the polymerizations of the isobutene and α-methylstyrene are carried out concurrently.

References Cited

UNITED STATES PATENTS

| 2,403,779 | 7/1946 | Bailey | 260—683.15 B |
| 3,385,905 | 5/1968 | Smith | 260—669 P |

CURTIS R. DAVIS, Primary Examiner

U.S. Cl. X.R.

260—683.15 B